United States Patent
Levine et al.

(10) Patent No.: US 7,627,457 B2
(45) Date of Patent: Dec. 1, 2009

(54) USING HIGHLY SKEWED CLOCKS FOR APPLICATION BASED TRACING AND APPLICATION BASED NORMALIZATION OF PROCESSOR CLOCKS IN AN SMP ENVIRONMENT

(75) Inventors: Frank Eliot Levine, Austin, TX (US); David Kevin Siegwart, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 458 days.

(21) Appl. No.: 11/608,909

(22) Filed: Dec. 11, 2006

(65) Prior Publication Data

US 2008/0109673 A1 May 8, 2008

Related U.S. Application Data

(63) Continuation of application No. 11/103,786, filed on Apr. 12, 2005, now Pat. No. 7,188,052.

(51) Int. Cl.
*G06F 11/00* (2006.01)
(52) U.S. Cl. .................. 702/187; 370/449; 370/516; 702/89; 714/700
(58) Field of Classification Search .............. 702/85, 702/89, 176, 187; 709/400, 401; 710/5; 713/400; 714/45, 700, 724; 717/128; 370/449, 370/516; 716/6
See application file for complete search history.

(56) References Cited

U.S. PATENT DOCUMENTS

| | | | |
|---|---|---|---|
| 5,964,846 A | 10/1999 | Berry et al. | |
| 6,269,410 B1 | 7/2001 | Spasojevic | |
| 6,470,483 B1 | 10/2002 | Rodriguez et al. | |
| 6,546,548 B1 | 4/2003 | Berry et al. | |
| 6,615,370 B1 | 9/2003 | Edwards et al. | |
| 6,661,810 B1 | 12/2003 | Skelly et al. | |
| 6,697,968 B1 | 2/2004 | Orfali | |
| 6,711,693 B1 | 3/2004 | Golden et al. | |
| 6,732,307 B1 | 5/2004 | Edwards | |
| 6,763,385 B1 | 7/2004 | Orfali | |
| 7,492,785 B2 * | 2/2009 | Seligman et al. ........... 370/449 |
| 2004/0139375 A1 | 7/2004 | Benesty | |

* cited by examiner

*Primary Examiner*—John H Le
(74) *Attorney, Agent, or Firm*—Yee & Associates, P.C.; David A. Mims, Jr.

(57) ABSTRACT

A computer-implemented method, for application based tracing and for normalization of processor clocks in a symmetric multiprocessor environment. By deliberately establishing a large skew among processor clocks, it is possible to perform application based tracing by directly using the processors. In addition, the identity, time stamp, and drift information of each processor may be used to create a time library. The time library is used to adjust a measured time to execute a program or software routine. The adjusted time is a normalized time that is statistically more accurate than the measured time alone. The adjusted time is then reported as the time to execute the program or software routine.

8 Claims, 6 Drawing Sheets

USING HIGHLY SKEWED CLOCKS FOR APPLICATION BASED TRACING AND APPLICATION BASED NORMALIZATION OF PROCESSOR CLOCKS IN AN SMP ENVIRONMENT

This application is a continuation of application Ser. No. 11/103,786, filed Apr. 12, 2005, now U.S. Pat. No. 7,188,052.

BACKGROUND OF THE INVENTION

1. Technical Field

The inventions described herein relate to computers and computer programs. In particular, the inventions relate to using highly skewed clocks for application based tracing and application based normalization of processor clocks in a symmetric multiprocessor (SMP) environment.

2. Description of Related Art

A computer central processing unit (CPU) may include a high frequency clock used for various functions and applications. For example, a high frequency clock can define a step in a fetch, decode, and execute cycle for the processor. High frequency clocks may be distinguished from other system clocks, which provide date and time facilities for a computer system. The computer system uses different, high frequency clocks because high frequency clocks are updated at a relatively high frequency and system clocks do not need to use an extremely high frequency. The precise frequency of a high frequency clock is dependent upon the operational clock speed of a particular processor. For example, a processor configured to operate at a clock speed above one gigahertz will include a high frequency clock capable of providing a timing resolution of about a nanosecond or less.

High frequency clocks in CPUs have many applications. For example, such clocks are useful for the precise measurement of elapsed time and therefore have useful applications in the measurement of performance statistics for computer programs executing in a processor. For example, high frequency clocks may be used for application based tracing to determine the performance of an application.

The high resolution of the clock allows the measurement of elapsed time for very short program fragments, such as fragments requiring only a few hundred processor cycles. A typical approach to making such a measurement is illustrated in the following pseudo-code:

```
start_time = getHighFrequencyClockTicks
<program fragment>
end_time = getHighFrequencyClockTicks
elapsed_time = end_time - start_time
```

The <program fragment> is the program fragment to be measured. The pseudo-code "getHighFrequencyClockTicks" corresponds to processor instructions to obtain a value of the high frequency clock and is typically implemented as a few instructions in order to avoid consuming a significant amount of processor time. For example, in the Intel IA32 processor, "getHighFrequencyClockTicks" corresponds to the RDTSC (read time stamp counter) instruction.

While the use of such high frequency clocks is advantageous for measuring elapsed time on a single processor, in a multiprocessor system problems can arise because it is not possible to guarantee that the clocks in each processor are synchronized in the sense that they express an identical standard time. The difference between a time value of one processor clock and a time value of another processor clock is termed clock skew. This characteristic of multiprocessor systems coupled with a possibility that a running program fragment can be switched between processors during execution makes accurately measuring an elapsed time very difficult. This characteristic arises because the start_time and end_time may be measured on different clocks in different CPUs. For example, the start_time may be measured on a clock in a processor on which the program fragment commenced execution, and the end_time may be measured on a clock in a processor on which the program fragment ceased execution. In this situation, the elapsed time includes not only the time taken to execute the program fragment, but also the unwanted clock skew.

One solution to this problem is to identify the processor on which the program fragment commences execution and to identify the processor on which the program fragment ceased execution. Thus, it is possible to determine when the elapsed time measurement is based on clock values for the same processor. For example, the pseudo-code could be amended to:

```
start_processor = getProcessorID
start_time = getHighFrequencyClockTicks
<program fragment>
end_time = getHighFrequencyClockTicks
end_processor = getProcessorID
elapsed_time = end_time - start_time
if start_processor = end_processor then elapsed_time
    is valid
```

Instructions or operating system facilities are known for obtaining an identifier for a processor (nominally indicated as "getProcessorID"). However, such instructions may require operating system support or may be synchronizing instructions which interfere with the measurement of time. Further, it is possible that the performance measurement program is switched to a different processor between the "getProcessorID" instruction and the "getHighFrequencyClockTicks" instruction. Consequently, the "getHighFrequencyClockTicks" instruction will obtain a clock value for a processor which is different than the processor identified by the "getProcessorID" instruction.

Thus, it would be advantageous to provide a method and mechanism for identifying a time value of a high frequency clock in a processor and for identifying a processor in a single indivisible operation. By using such a method and mechanism, an intervening operation, such as a redispatch operation that causes the program to be performed on another processor, can be accounted when determining the time required to execute the program.

SUMMARY OF THE INVENTION

The present invention provides a method, apparatus and computer instructions for application based tracing without requiring kernel access during trace writing and for normalization of processor clocks in a symmetric multiprocessor environment. By deliberately establishing a large skew among the various processor clocks in a data processing system, the time stamp of each clock may be used to determine the identity of each processor used when the trace time is gathered. In addition, the time stamp may be used to determine precisely how much time has passed between trace events regardless of drift in the clocks among the processors. Thus, by deliberately establishing a large skew among processor clocks, it is possible to perform application based tracing by directly using a separate buffer for each processor. Performing application based tracing with this method is faster and more efficient than prior methods of performing application based tracing. In addition, processor identification and the time stamp and drift information of each processor may be used by a time library. The time library may be used to provide monotonically increasing time that is statistically more accurate than the measured time alone. The adjusted time is then used by the program or software routine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
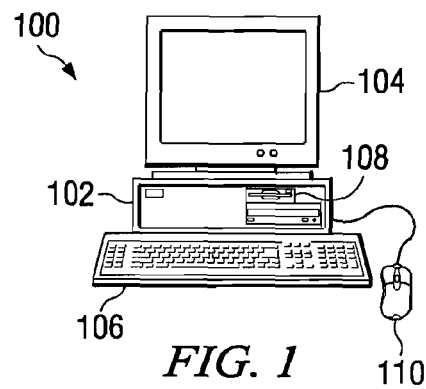
FIG. 1 is a pictorial representation of a data processing system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
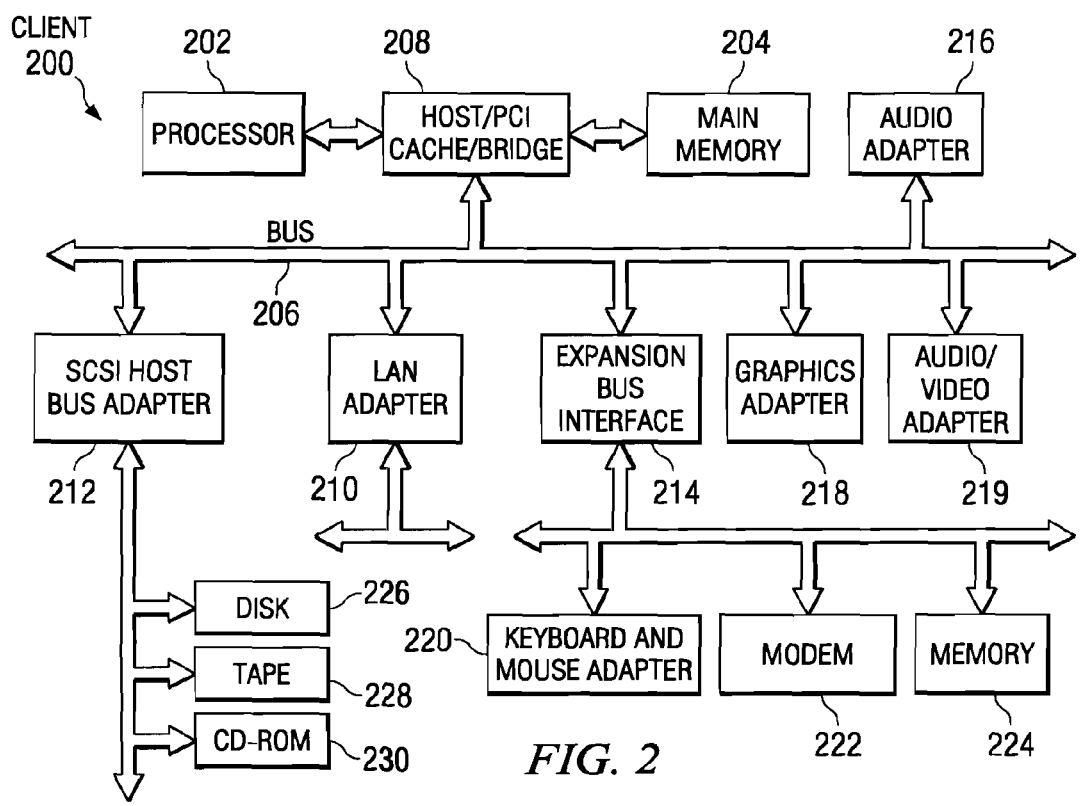
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, apparatus and computer instructions for application based tracing and for normalization of processor clocks in a symmetric multiprocessor environment. By deliberately establishing a large skew among the various processor clocks in a data processing system, the time stamp of each clock may be used to record the identity of each processor used to execute a program or software routine. In addition, the identity and time stamp may be used to determine precisely how much time is required to execute the program or software routine, regardless of drift in the clocks among the processors. Thus, by deliberately establishing a large skew among processor clocks, it is possible to perform application based tracing by directly using the processors. Performing application based tracing with this method is faster and more efficient than prior methods of performing application based tracing. In addition, the identity, time stamp, and drift information of each processor may be used to create a time library. The time library is used to adjust a measured time to execute a program or software routine. The adjusted time is a normalized time that is statistically more accurate than the measured time alone. The adjusted time is then reported as the time to execute the program or software routine.

Figure 3:
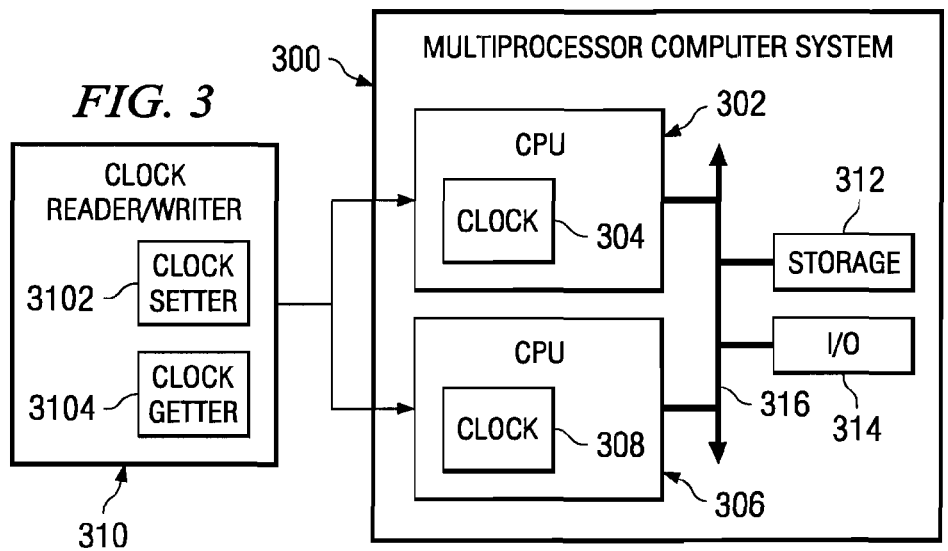
FIG. 3 is a block diagram of a multiprocessor computer system including two CPUs, in accordance with a preferred embodiment of the present invention.

FIG. 3 is a block diagram of a multiprocessor computer system 300 including two CPUs 302 and 306 in accordance with a preferred embodiment of the present invention. The computer system may be similar to the computer system shown in FIG. 1 and FIG. 2. However, multiple processors, such as processor 202 in FIG. 2, are used. Similarly, multiple computer systems, such as multiple systems of system 100 in FIG. 1, may be operably connected to each other to create a multiprocessor data processing environment.

Each of CPUs 302 and 306 shown in FIG. 3 includes clocks 304 and 308. Clocks 304 and 308 are high frequency clocks internal to the CPUs. For example, CPUs 302 and 306 are Intel IA32 CPUs such as Intel Pentium and clocks 304 and 308 are sixty-four bit unsigned clock values updated regularly, such as every nanosecond. The multiprocessor computer system 100 further includes storage 312 which can be any read/write storage device such as a random access memory (RAM) or a non-volatile storage device. An example of a non-volatile storage device includes a disk or tape storage device. Multiprocessor computer system 300 also includes an input/output (I/O) interface 314 which is an interface to devices for the input or output of data, or for both input and output of data. Examples of I/O devices connectable to I/O interface 314 include a keyboard, a mouse, a display (such as a monitor) and a network connection. CPUs 302 and 306 are communicatively connected to storage 312 and I/O interface 314 via data bus 316.

FIG. 3 further includes clock reader/writer 310. Clock reader/writer 310 is a hardware or software component capable of reading values of the clocks 304 and 306 and writing values to clocks 304 and 306. Clock reader/writer 310 further includes clock setter 3102 and clock getter 3104. Clock setter 3102 is a software or hardware component for setting a value of each of clocks 304 and 308. For example, clock setter 3102 can use a CPU instruction of each of CPUs 302 and 306 to set a value of each of the corresponding clocks 304 and 308. Similarly, clock getter 3104 is a software or hardware component for retrieving a value of each of clocks 304 and 308. For example, clock getter 3104 can use a CPU instruction of each of CPUs 302 and 306 to retrieve a value of the corresponding clocks 304 and 308. Such an instruction is the RDTSC (read time stamp counter) instruction on the Intel IA32 CPU architecture.

In use, the multiprocessor computer system 300 executes software routines including operating system software and application software in one or both of CPUs 302 and 306. Software routines are stored in storage 312 and transferred between storage 312 and CPUs 302 and 306 via data bus 316. Rules of operation regarding the use of CPUs 302 and 306 (such as which software routines run on which CPU) are decided by operating logic (not shown) of multiprocessor computer system 300 such as a software operating system or a firmware operating subsystem. At runtime, clock setter 3102 sets a value of clock 304 such that the value of clock 304 includes an encoded indicator, which identifies CPU 302 containing clock 304. Similarly, clock setter 3102 sets a value of clock 308 such that the value of clock 308 includes an encoded indicator, which identifies CPU 306 containing clock 308. A method for encoding CPU identifiers in a corresponding high frequency CPU clock is considered in detail below with respect to FIG. 4A.

Further, at runtime clock getter 3104 retrieves a value of clock 304 and extracts an encoded CPU identifier. The extracted CPU identifier corresponds to CPU 302 containing clock 304. Similarly, at runtime clock getter 3104 retrieves a value of clock 308 and extracts an encoded CPU identifier. The extracted CPU identifier corresponds to CPU 306 containing clock 308. A method for decoding a CPU identifier and a clock value from a high frequency CPU clock is considered in detail below with respect to FIG. 4B.

Figure 4A:
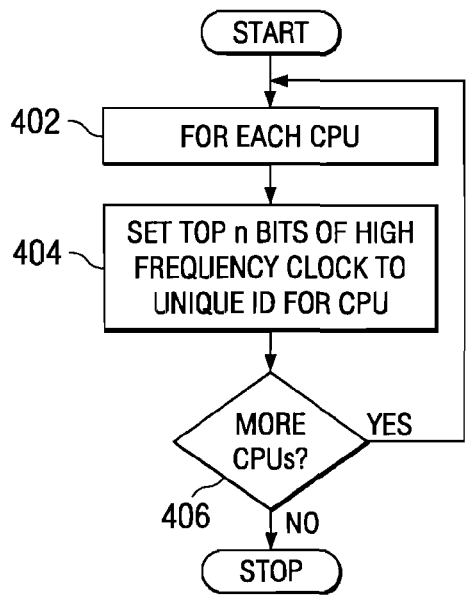
FIG. 4A is a flowchart illustrating a method for encoding CPU identifiers in a corresponding high frequency CPU clock, in accordance with a preferred embodiment of the present invention.

FIG. 4A is a flowchart illustrating a method for encoding CPU identifiers in a corresponding high frequency CPU clock in accordance with a preferred embodiment of the present invention. The method shown in FIG. 4A may be implemented by clock reader/writer 310 of FIG. 3 or may be implemented by some other component of multiprocessor computer system 300 of FIG. 3. A loop is initiated through each CPU in multiprocessor computer system 300 (step 402). Alternatively, clocks are set by a request to a device driver or kernel extension which issues an IPI to signal all processors to take an interrupt. When the signal is received, each processor bumps a count and loops until the count equals the total number of processors. When the count equals the total number of processors, each processor issues the clock change request and exits the interrupt code. For a current CPU in multiprocessor computer system 300, a set of bits of a high frequency clock associated with the current CPU is set to a value uniquely identifying the CPU (step 404). In an illustrative embodiment, the set of bits is the most significant set of bits, such as a first three bits in a sixty-four bit clock field. Subsequently, the method determines if multiprocessor computer system 300 includes more CPUs and loops to step 402 accordingly (step 406).

Figure 4B:
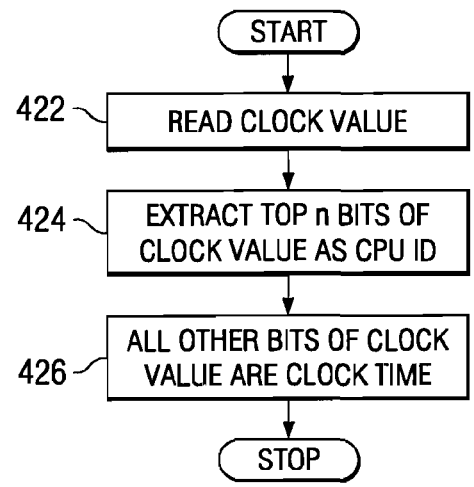
FIG. 4B is a flowchart illustrating a method for decoding a CPU identifier and a clock value from a high frequency CPU clock, in accordance with a preferred embodiment of the present invention.

FIG. 4B is a flowchart illustrating a method for decoding a CPU identifier and a clock value from a high frequency CPU clock, in accordance with a preferred embodiment of the present invention. The method shown in FIG. 4A may be implemented by clock reader/writer 310 of FIG. 3 or may be implemented by some other component of multiprocessor computer system 300 of FIG. 3. A value of the clock is read using clock getter 3104 (step 422). Then, a set of bits of the clock which include a value uniquely identifying a CPU containing the clock are read (step 424). For example, a CPU identifier bit mask which is a binary mask including a single bit for each bit of the clock value can be used to extract the CPU identifier from the clock value. The mask has binary values of '1' for bits included in the set of bits having the CPU identifier and binary values of '0' for all other bits. Applying the mask to the clock value using a logical AND operation results in the extraction of only the bits of the clock value for which a corresponding mask bit is set to the value '1'. Subsequently the remaining bits of the clock value (i.e. those bits not forming part of the CPU identifier) are extracted and correspond to a time represented by the clock (step 422). These remaining bits can be extracted using a further mask which is the inverse of the CPU identifier mask described above.

Figure 5:
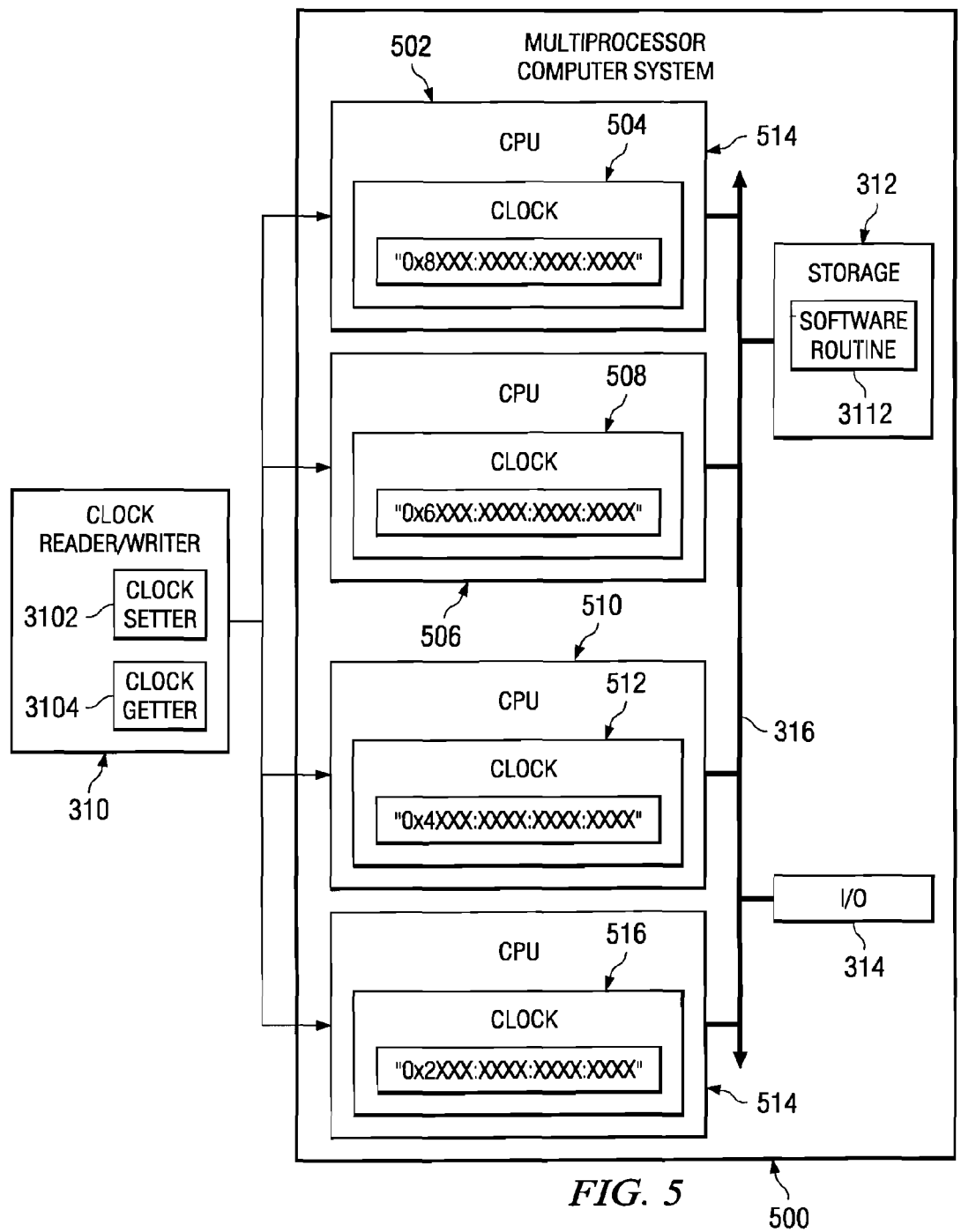
FIG. 5 is a block diagram of a multiprocessor computer system including four CPUs, in accordance with a preferred embodiment of the present invention.

FIG. 5 is a block diagram of a multiprocessor computer system 300 including four CPUs 502, 506, 510, and 514, in accordance with a preferred embodiment of the present invention. The arrangement of FIG. 5 is used to demonstrate a preferred embodiment of the invention in use. Many of the elements of FIG. 5 are identical to those described with respect to FIG. 3. Those identical elements are references using the same reference numerals. FIG. 5 further includes software routine 3112 which is a set of software instructions such as machine instructions stored in storage 312 of the multiprocessor computer system 500. The software routine 3112 is executable in any of the four CPUs 502, 506, 510, or 514 of multiprocessor computer system 500.

Each of CPUs 502, 506, 510, and 514 includes a clock, including clocks 504, 508, 512, and 516 respectively. Each of the clocks of includes a sixty-four bit clock value represented in FIG. 5 in hexadecimal notation (the clock value is indicated by a preceding "0x" for each clock value). For example, clock 504 is illustrated as having a clock value of "0x8XXX:XXXX:XXXX:XXXX". The capitalized "X" character is used to indicate some value of the time of clock 504 which is of no particular significance to this description, and the colons are used to improve the readability of the hexadecimal numeral. The other clocks 508, 512, and 516 include similar values respectively.

Each of the clocks of FIG. 5 are arranged such that their values have been set by clock setter 3102. Clock setter 3102 has set the values of each clock such that the most significant three bits of each clock corresponds to a CPU identifier. The most significant three bits is represented by an even value of the first hexadecimal digit in each clock value. Thus, for clock 504 with a value of "0x8XXX:XXXX:XXXX:XXXX" the first three bits of the clock value is "0x8". Thus, the hexadecimal number "0x8" identifies CPU 502. Similarly, clock 506 has a value of "0x6XXX:XXXX:XXXX:XXXX" with the first three bits of the clock value being "0x6". Thus, the hexadecimal number "0x6" identifies CPU 506, and so on for clocks 510 and 514.

An illustrative embodiment of the present invention will now be considered in use for the arrangement of multiprocessor computer system 500 of FIG. 5 and for two scenarios detailed below where the following pseudo-code is executed:

```
A) start_clock_val = getClockValue for current CPU
B) execute software routine 1122
C) end_clock_val = getClockValue for current CPU
```

The "getClockValue" at steps A and C for the current CPU corresponds to the function of clock getter 3104 which obtains a value of a high frequency clock from a current CPU. The current CPU is a CPU on which the pseudo-code us considered to be executing at a point in time.

In a first scenario the pseudo-code will be considered in which the pseudo-code commences execution of step A on CPU 514 but is redispatched during the execution of software routine 3112 (step B) to CPU 506. Consequently, in the first scenario, the pseudo-code completes execution of step C on CPU 506. Considering now the pseudo-code in detail for the first scenario, at step A the current CPU is 514 and the start_clock_val is therefore obtained to be a value of clock 516, which is "0x2XXX:XXXX:XXXX:XXXX". Subsequently, at step B, software routine 3112 is executed and the pseudo-code is also redispatched to CPU 506. Subsequently at step C the current CPU is 506 and the end_clock_val is therefore obtained to be a value of clock 508, which is "0x6XXX:XXXX:XXXX:XXXX". Thus, using the method of FIG. 4B it is possible to use the values of start_clock_val and end_clock_val to identify the CPU and the clock time value both before and after the execution of software routine 3112.

Considering first the start_clock_val of the first scenario using the method of FIG. 4B, at step 422 the value has been read as "0x2XXX:XXXX:XXXX:XXXX" (see step A above). At step 424 the top three bits of the clock value is read as the CPU ID. This can be achieved using a mask corresponding to the top three bits of the clock value and a logical AND operation. Such a mask has the value of "0xE000:0000:0000:0000" and can be used to extract the top three bits of the start_clock_val as follows:

```
start_clock_val AND mask = CPU ID
"0x2XXX:XXXX:XXXX:XXXX" AND
"0xE000:0000:0000:0000" = "0x2000:0000:0000:0000"
```

Thus, the CPU ID for the start_clock_val is determined to be "2" (excluding all other bits of the clock value). Subsequently, at step 426, the clock time can be read as the value of all other bits of the clock value. This can be achieved using a mask in the same manner, but the mask would be "0x1FFF:FFFF:FFFF:FFFF" in order to extract all other bits.

Similarly, considering the end_clock_val of the first scenario using the method of FIG. 4B, at step 422 the value has been read as "0x6XXX:XXXX:XXXX:XXXX" (see step C above). At step 424 the top three bits of the clock value is read as the CPU ID. This can be achieved using a mask corresponding to the top three bits of the clock value as above.

```
end_clock_val AND mask = CPU ID
"0x6XXX:XXXX:XXXX:XXXX" AND
"0xE000:0000:0000:0000" = "0x6000:0000:0000:0000"
```

Thus, the CPU ID for the start_clock_val is determined to be "6" (excluding all other bits of the clock value). Subsequently, at step 426, the clock time can be read as the value of all other bits of the clock value using a mask of "0x1FFF: FFFF:FFFF:FFFF".

Accordingly, it can be determined that the start_clock_val includes an indication that the pseudo-code for the first scenario commenced on a CPU with an ID of "2", and completed on a CPU with an ID of "6". In the first scenario, it is therefore possible to identify that software routine 3112 was redispatched during execution from an analysis of the clock values alone.

The pseudo-code will now be considered for a second scenario in which the pseudo-code commences execution on CPU 510 and is not redispatched. Consequently, in the second scenario, the pseudo-code completes execution on CPU 510.

In a second scenario, the pseudo-code will be considered in which the pseudo-code commences execution of step A on CPU 510 and is not redispatched during the execution of software routine 3112 (step B). Consequently, in the second scenario the pseudo-code completes execution of step C on CPU 510. Considering now the pseudo-code in detail for the first scenario, at step A, the current CPU is 510 and the start_clock_val is therefore obtained to be a value of clock 512, which is "0x4XXX:XXXX:XXXX:XXXX". Subsequently, at step B software routine 3112 is executed without redispatch. Subsequently at step C the end_clock_val is obtained to be a value of clock 512, which is "0x4XXX: XXXX:XXXX:XXXX". Thus, using the method of FIG. 4B it is possible to use the values of start_clock_val and end_clock_val to identify the CPU and the clock time value both before and after the execution of software routine 3112.

Considering first the start_clock_val of the second scenario using the method of FIG. 4B, at step 422 the value has been read as "0x4XXX:XXXX:XXXX:XXXX" (see step C above). At step 424 the top three bits of the clock value is read as the CPU ID. This is achieved using a mask corresponding to the top three bits as for the first scenario above and as follows:

---
start_clock_val AND mask = CPU ID
"0x4XXX:XXXX:XXXX:XXXX" AND
"0xE000:0000:0000:0000" = "0x4000:0000:0000:0000"
---

Thus, the CPU ID for the start_clock_val is determined to be "4" (excluding all other bits of the clock value). Subsequently, at step 426, the clock time can be read as the value of all other bits of the clock value. This can be achieved using the mask as described above with respect to the first scenario.

Similarly, considering the end_clock_val of the second scenario using the method of FIG. 4B, at step 422 the value has been read as "0x4XXX:XXXX:XXXX:XXXX" (see step A above). At step 424 the top three bits of the clock value is read as the CPU ID. This can be achieved using a mask corresponding to the top three bits of the clock value as above.

---
end_clock_val AND mask = CPU ID
"0x4XXX:XXXX:XXXX:XXXX" AND
"0xE000:0000:0000:0000" = "0x4000:0000:0000:0000"
---

Thus, the CPU ID for the start_clock_val is determined to be "4" (excluding all other bits of the clock value). Subsequently, at step 426, the clock time can be read as the value of all other bits of the clock value using the mask as described above with respect to the first scenario.

Accordingly, it can be determined that the start_clock_val includes an indication that the pseudo-code for the second scenario commenced on a CPU with an ID of "4", and completed on a CPU with an ID of "4". In the second scenario, it is therefore possible to identify that software routine 3112 commenced and completed execution on the same CPU.

Thus, it is possible to retrieve a value of a time represented by a high frequency clock in a processor and an identification of the corresponding processor in a single indivisible operation by encoding the processor identifier in the clock value. Therefore, no opportunity is present for the reading of the value of the clock or the identification of the processor to be accompanied by an intervening step—such as a redispatch operation causing a change of processor. This guarantees that a value of time read from a clock corresponds to the same CPU as is identified by the CPU identifier.

It is theoretically possible that the time encoded in the lower bits (as denoted by the character "X") will at some time overflow into the upper three bits of the clock value. This can corrupt the CPU identifier encoded in the upper three bits making its value meaningless. To prevent this happening, the time encoded in these lower bits cannot be initially set to high values, and in particular can be set to zero, at the same time as the CPU identification is encoded. For a nano-second timer, the time interval measurable by such a clock is in the region of $2^{61}$ ns=73 years, so for all practical purposes such corruption should not happen. While this time interval is dependent upon the frequency of update of the clock (i.e. the frequency at which the clock advances an increment), as clock frequencies increase so does the number of bits for the storage of values of such clocks.

Figure 6:
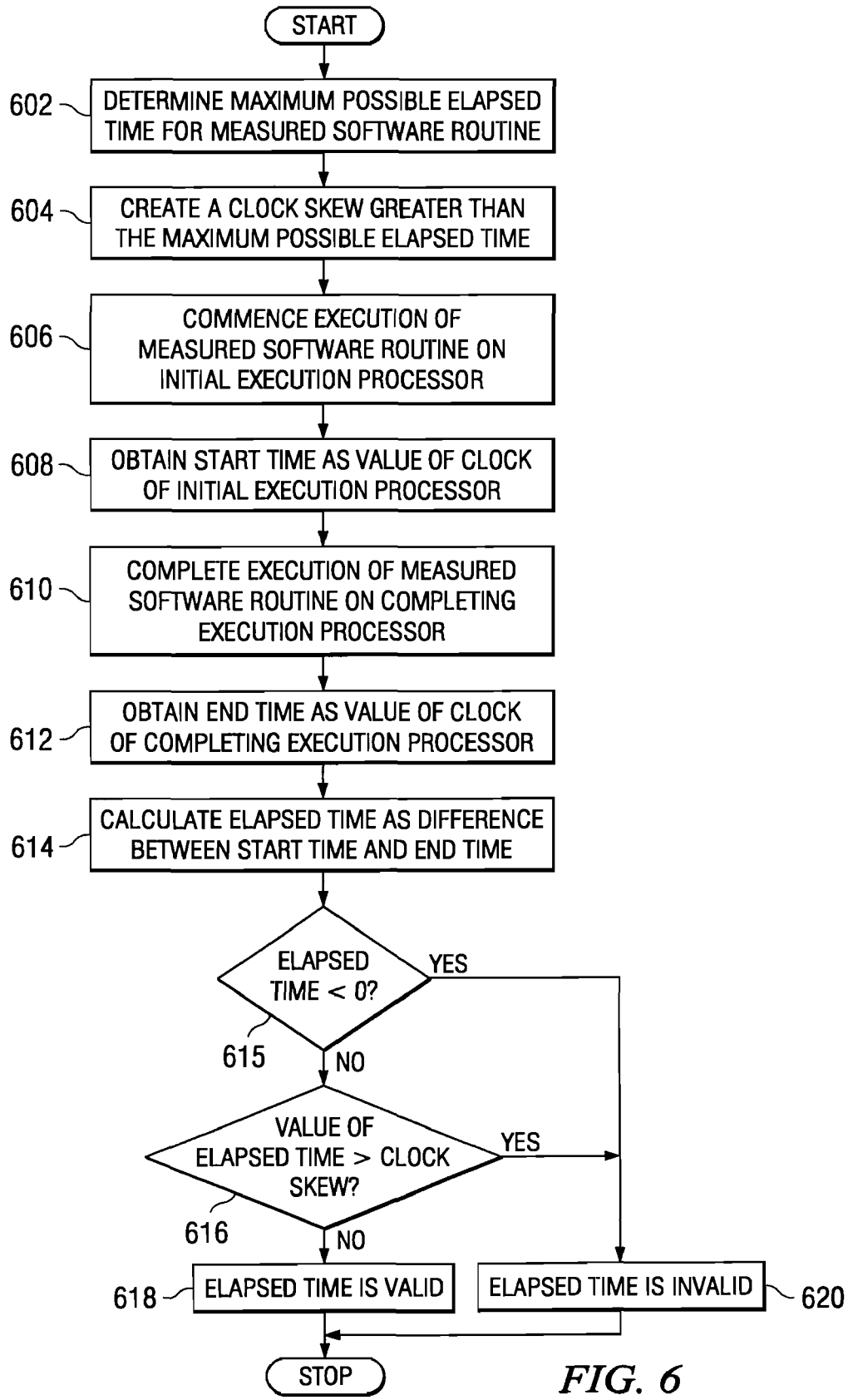
FIG. 6 is a flowchart illustrating a method of using clock skew to evaluate whether a measured elapsed time is valid, in accordance with a preferred embodiment of the present invention.

FIG. 6 is a flowchart illustrating a method of using clock skew to evaluate whether a measured elapsed time is valid, in accordance with a preferred embodiment of the present invention. The steps shown in FIG. 6 may be performed using clock reader 310 of FIG. 3 and/or the multiprocessor computer system 300 of FIG. 3.

First, the maximum expected elapsed time for a particular software routine to be measured is determined (step 602). The software or hardware, or management system, used to determine the elapsed time for a particular software routine may prompt a user for the maximum expected elapsed time. (Clock getter 310 of FIG. 3 may be the management system or part of the management system.) The management system may also estimate the maximum expected elapsed time based on the size of the program, difficulty in executing the program, or any other automatically ascertainable parameter.

Subsequently, the user or the system manager sets a clock skew greater than the maximum expected elapsed time (step 604). The clock skew may be set in the manner described with regards to FIG. 3 through FIG. 5. In any case, the clock skew is set sufficiently large that it is unlikely that the software routine will take longer than the maximum expected elapsed time.

For example, if the multiprocessor system contains eight CPUs, each with its own clock, then the top bits of the processor counter may be used to store a distinguishing identifier that identifies a given CPU. For the hexadecimal formats shown in FIG. 5, using eight CPU identifiers would ensure a minimum skew of $2^{61}$ cycles, which corresponds to about eighteen point three years for a four gigahertz data processing system. While the clocks may be set beginning with the first CPU and proceeding to the last CPU, in the illustrative embodiments the clocks are set in reverse order starting with the last CPU, CPU (N), where N represents the number of processors. Setting the clocks in reverse order ensures a strong ordering with synchronization instructions. Thus, the clock of one CPU will move slightly forward before the clock of the previous CPU is set.

In some data processing systems, the CPU clock may only be set to zero or only the low order bits (32 bits) may be set. In this case, it is possible to reset the clocks in the same order as described above, but now the system is caused to sleep a number of cycles, represented by X, between resetting the clock of CPU (N) and the clock of CPU (N−1). The number, X, is greater than $2^M$, where M is selected based on the maximum expected elapsed time for a software routine. The number X need not be exact, so long as X is between $2^M$ and $2^M/N$. In this case, the CPU identifier exists in the bits M+1 to M+$\log_2$(N).

In one non-limiting example, the value of M may be set to thirty-eight, which yields a value of $X=2^{38}$ cycles, or about 68.72 seconds in a four gigahertz data processing system. However, X may be between 68.72 and 77.31 seconds. Thus, about 68.72 seconds is allowed to elapse between resetting one CPU clock and the previous CPU clock. For eight processors, the entire process would require about nine minutes, but would only be done once. In this example, it is possible to measure time intervals accurately to a resolution of single cycles up to about 68.7 seconds. In the illustrative embodiments, one should account for possible drift, so setting X to an average of 73.02 seconds would allow for a drift of 4.295 seconds, or about $1.7180 \times 10^{10}$ cycles, which is more than enough for practical data processing systems. Many non-uniform memory access data processing systems have drifts of about 130,000 cycles in a second, so the clocks would not have to be reset again for about 36.7 hours.

Turning back to FIG. 6, after the clock skew has been set in step 604, the initial execution processor commences execution of the measured program or the measured software routine (step 606). In other words, the first data processing system begins executing the software to be measured. Subsequently, a start time value is obtained as the value of the clock of the initial execution processor at the moment the execution begins (step 608). Thus, the start time of the process is measured as the time reported by the first high frequency clock of the first processor.

Thereafter, the data processing system continues execution of the measured program or measured software routine (step 610). During processing, one or more of the processors may contribute to executing the program software routine. Regardless of how many processors contribute to executing the program or software routine, the final processor that contributes to the execution is the completing processor. The end time is the time value of the clock of the completing processor at the moment the program or the software routine ends (step 612).

The elapsed time is calculated to be the difference between the start time and the end time (step 614). The management system then determines whether the elapsed time is less than zero (step 615). If the elapsed time is less than zero, then the elapsed time is invalid (step 620). If the elapsed time is invalid, the elapsed time is discarded and the process terminates thereafter.

If the elapsed time is not less than zero, then the management system determines whether the elapsed time is greater than the clock skew (step 616). If so, then the elapsed time is invalid, the elapsed time is discarded, and the process terminates thereafter (step 620). If the elapsed time is not greater than the clock skew, then the elapsed time is valid (step 618). In this case, the elapsed time is recorded and the process terminates thereafter.

Figure 7:
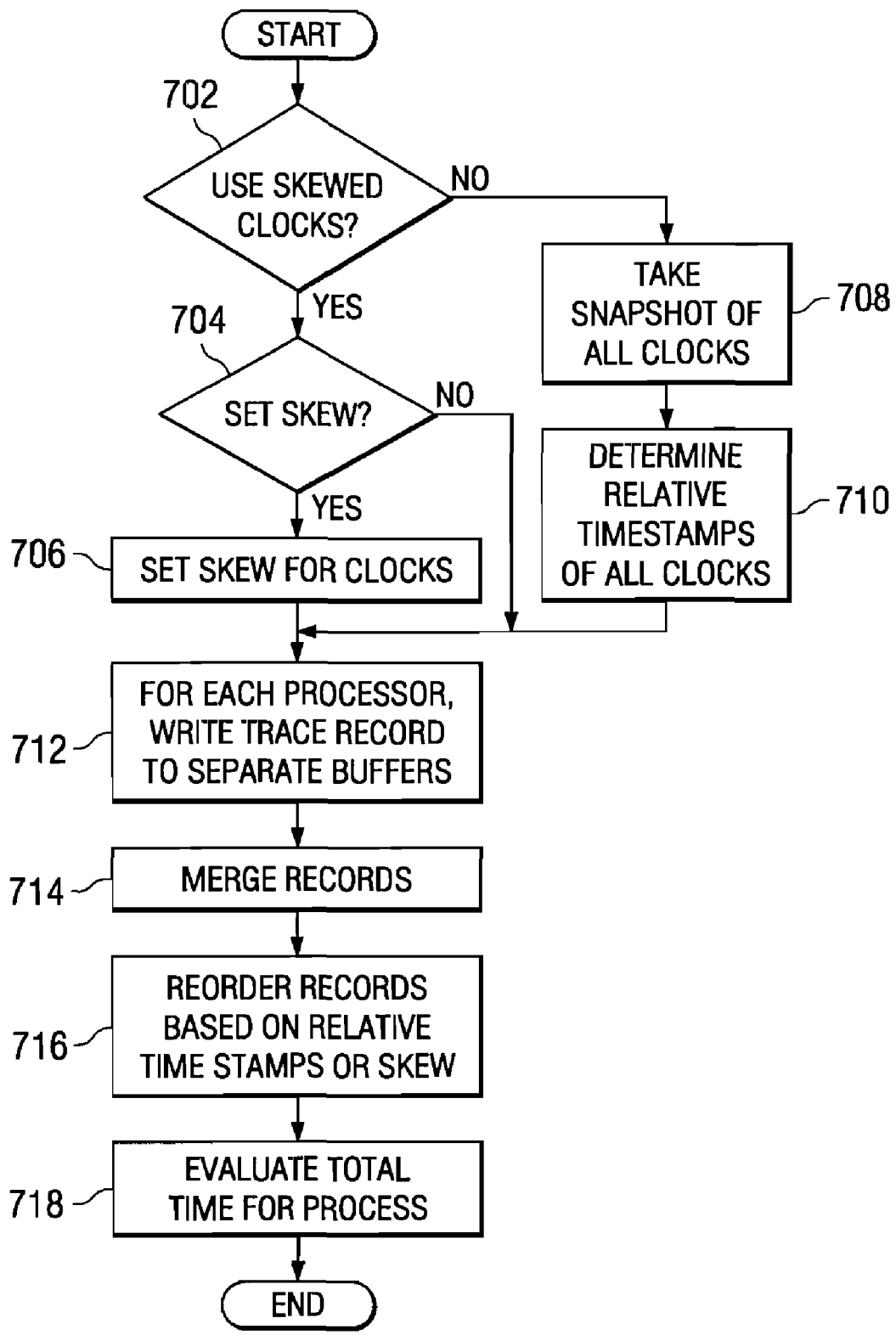
FIG. 7 is a flowchart illustrating a method of performing application based tracing using clock skew, in accordance with a preferred embodiment of the present invention.

FIG. 7 is a flowchart illustrating a method of performing application based tracing using clock skew, in accordance with a preferred embodiment of the present invention. The steps shown in FIG. 7 may be performed using clock reader 310 of FIG. 3 and/or the multiprocessor computer system 300 of FIG. 3. FIG. 7 shows that once a large clock skew has been set among the various CPU clocks, such as by the method shown in FIG. 6, the clock skew may be used to allow application based tracing to be performed more efficiently.

Application tracing is done by writing trace records without using a kernel device driver or kernel extension. The trace records typically identify events, such as method entries, exits, get lock, and free locks. Tracing may be carried out to evaluate reliability, availability, and serviceability (RAS) in Java virtual machines (JVMs). Trace records should be written such that the time ordering of the records is maintained without consuming an unacceptable amount of resources.

A trace record contains information about an event that occurred in the application. It may also have a time stamp which can be used to determine the amount of time a processor spends on a given event, task, program, or software routine. Writing trace records to a single buffer causes severe contention and reduces system performance. Tracking separate trace records in separate buffers via separate records for each thread causes difficulties in merging data back together when time stamps are different on different processors. Thus, although tracking trace records in separate buffers via a thread greatly reduces contention, the difficulties of determining the ordering of events may make this approach unacceptable.

The methods described above with respect to deliberately setting a large clock skew relative to the processors in a data processing system may be used to write trace records directly to a processor buffer, using the processor identification found in the time stamp. Doing so allows application based tracing to be performed more quickly and allows for more accurate post processing, where the timestamps may be adjusted as needed by using processor skew information. Alternative application support to determine the processor and time stamp require loops, such as, for example:

```
Until (P1 == P2)
    P1 = Determine processor
    Get time stamp
    P2 = determine processor
```

Even this approach is not fool proof in that theoretically there could be switches to different processors between each step, with the time stamp obtained from a different processor. However, the illustrative embodiments, this problem is not expected to occur. If this problem did occur, the problem would be so infrequent that the problem would not warrant important consideration.

In addition, some effort may be involved in determining the processor. For some processors, determining the processor must be done in the kernel, which requires a state change. For these processors, the operating system (OS) or kernel device driver may provide a means to identify the processor. For example, the OS or kernel extension may keep the processor identifier in a fixed location (mapped to application space) or in a register. Trace records are written to the specific processor buffer by first using a semaphore or mapping system to allocate space for the record to be written. This semaphore or mapping system may be an instruction such as a compare exchange instruction. The update to the length is made in a while loop, guaranteeing that only one update to the length occurs at a time. The record is then written to the buffer. It is possible the cmpxchg instruction (in the IA32 instruction set architecture) and the trace record may be written from a processor different from the one determined from the timestamp, but this should be an infrequent occurrence.

During post-processing, the trace records may be merged knowing that the timestamps were specific to each processor. Merging the trace records allows for accurate adjustments of the time stamps. Accurate adjustments of the timestamps is critical for determining the ordering of events and for determining the actual time between events or trace records.

Turning back to FIG. 7, the process begins with the management system determining whether the clock skew will be used (step 702). As shown below with regard to steps 708 and 710, the method need not use the clock skew method described above. If clock skew will be used to perform application based tracing, then the management system determines whether clock skew has been set among the high-frequency processor clocks in the data processing system (step 704). If the clock skew should be set, then the clock skew is set (step 706) according to the methods described above. If the clock skew has already been set, or after the clock skew has been set by a process such as by the process shown in FIG. 6, then the process continues to write trace records to separate buffers (step 712). Step 712 is described in more detail, below.

As described above, trace records may be recorded to separate buffers even if the clock skew has not been set. If clock skew will not be used (step 702), then a snapshot is taken of all of the high frequency processor clocks in the data processing system (step 708). Thereafter, the relative time stamps of all clocks are determined (step 710).

Once the relative time stamp and identity of each processor is known, or the identity of each processor and the clock skew is known, the process continues with writing the trace record of each processor to separate buffers (step 712). A trace record contains information about an application specific event. The time stamp of the trace record may be used to determine times between events, ordering of events, and the amount of time a processor spends on a given event, program, or software routine. A trace record from each processor is recorded to a separate, known buffer in order to avoid time delays caused by writing to a single buffer.

A mapping system is used to allocate the space for each record and each record may then be written to a corresponding buffer. Using the highly skewed clocks and a separate buffer for each thread is an acceptable approach. If a separate buffer is used for each thread, then a semaphore is not needed to allocate the length of the record. During post processing, the thread buffers are merged by reviewing the time stamps and adjusting the skews of each of the processors. This approach could also be used without large time skews, but the processor identify should be included in each record, at least when it changes for the thread.

Using separate buffers to track a trace record is possible because the identity and relative clock skew or time stamp of each processor is known. Thus, the trace record generated by a particular processor may be recorded to a particular known trace buffer. In addition, no need exists for synchronizing instructions to maintain atomicity in order to determine the identity of a processor. An atomic instruction in processor architecture refers to an instruction that is either completely executed or not executed at all. Thus, atomicity refers to an instruction, process, or object that is not executed in sub components. If the rate of clock drift is constant for each processor, then the time stamps may be prorated by the drift before merging the trace records. Thus, the effect of drift on the error in all trace records may be reduced.

Optionally, the trace records are merged into a single buffer (step 714). Merging the records is optional because a single processor may execute the entire program or subroutine, thereby vitiating the need to merge trace records from different buffers. In addition, information from less than all of the processors may be required. The step of merging trace records may be performed efficiently because the management system already knows which buffer contains the trace record for a corresponding processor. Alternatively, the time stamp may be used to determine the processor.

If the trace records are merged, then the trace records may be reordered in chronological or other order (step 716). Reordering the trace records allows a user to quickly ascertain how much total time was spent on executing the operation, program or software routine (step 718). The elapsed total time spent for an event with a start event and stop event trace record may be determined by taking the prorated difference between the start and stop time of the events. Other algorithms to find time on thread may be used if the time of dispatches is also recorded or available from kernel instrumentation. The large clock skew or defined time stamp allows reordering to take place because the identity of each involved processor is known. Furthermore, the time when a processor performs execution is known relative to when the other processors perform execution.

For example, if eight processors are involved in executing a program or software routine, then eight trace records would be written to eight separate buffers. As described above, the clock skew or time stamps ensure that the clocks accurately record time relative to one another. For example, when the clock skew is large, then it is unlikely that different clocks will appear to reverse their time ordering. Thus, when the trace records are merged, the management system may order the trace records in chronological order with little chance for error. The total time spent is the sum of the time spent by the eight individual processors. In addition, the time spent by each individual processor is known. Thus, a user may evaluate not only the overall performance of the data processing system, but also the performance of each individual processor.

Figure 8:
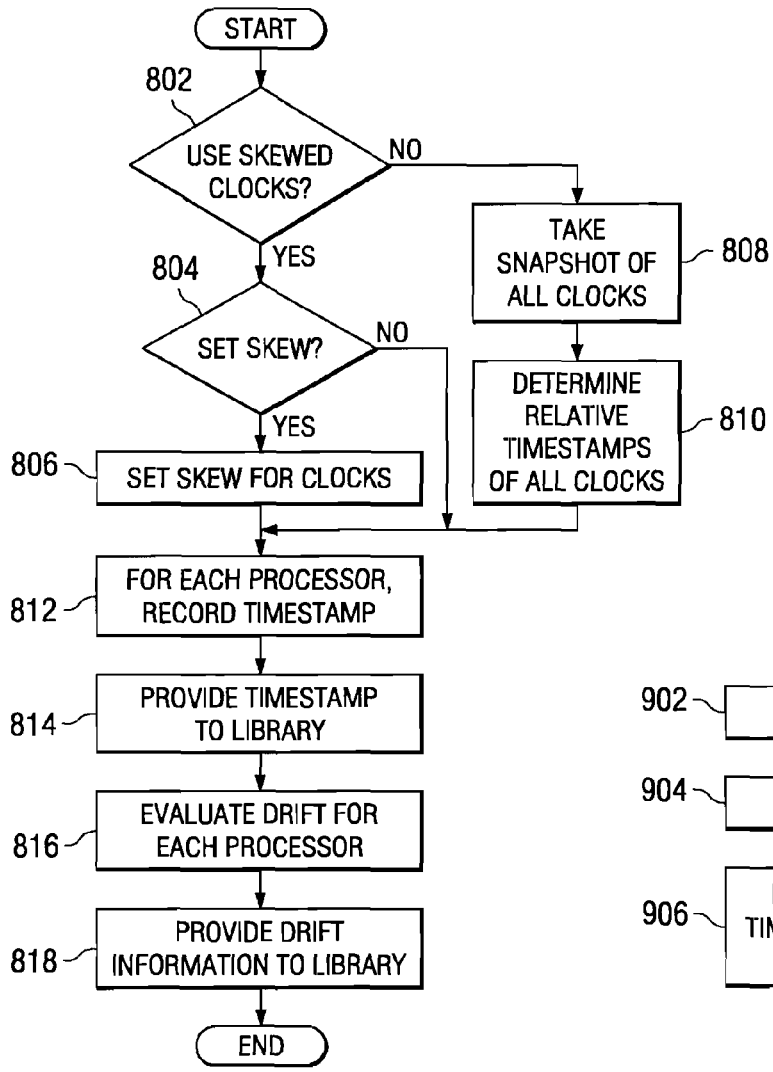
FIG. 8 is a flowchart illustrating a method of creating a library containing initial time stamp and drift information, in accordance with a preferred embodiment of the present invention.

FIG. 8 is a flowchart illustrating a method of creating a library containing initial time stamp and drift information, in accordance with a preferred embodiment of the present invention. The method of creating a large clock skew described above allows the identity of each processor in the data processing system and the proper time of each processor clock to be determined in an indivisible operation. Once the identity of the processors and the time their clocks measure are known, a time library may be created that further increases the speed and efficiency of determining the time required to execute a program or a software routine.

Upon a request for time, the time library is used to report a time that is normalized using information from one or more other processor clocks. By maintaining an application level time library that contains information regarding the skew among processor clocks and the drift rates of those clocks, the reported time can be normalized to an adjusted value of reported time. The adjusted value of reported time accurately represents the time required to execute a program or software routine, regardless of which processor clock is used to read time. Thus, the adjusted time will be accurate, even if determining which processor executed a program or software routine is difficult, and even if different processors execute the program or software routine between clock measurements.

Turning back to FIG. 8, the process of building a time library is initially similar to the process of performing application based tracing shown in FIG. 7. The process begins with a management system determining whether the clock skew will be used (step 802). As shown below with regard to steps 808 and 810, the method need not use the clock skew method described above. If clock skew will be used to create a time library, then the management system determines whether clock skew has been set among the high-frequency processor clocks in the data processing system (step 804). If the clock skew should be set, then the clock skew is set (step 806) according to the methods described above. If the clock skew has already been set, or after the clock skew has been set by a process such as by the process shown in FIG. 6, then the management system records the time stamp and identity of each processor (step 812).

As described above, a time library may be created even if the clock skew has not been set. If clock skew will not be used (step 802), then a snapshot is taken of all of the high frequency processor clocks in the data processing system (step 808). Thereafter, the relative time stamps and identities of all clocks are determined (step 810) as described above. The management system then records the time stamp and identity of each processor (step 812). Once the time stamp and identity of each processor has been recorded, the time stamp and identity of each processor is provided to the time library (step 814). A preferred embodiment is the IPI approach described previously with regard to FIG. 4A.

In order to adjust the time stamps to give more accurate times, the skewed clocks should be calibrated. To calibrate the clocks, the management system records the time stamp and identity of each processor simultaneously (step 812), so that at one moment in time all the processor identifiers and all the corresponding time stamps are recorded. A method of performing this step is to use a similar method to the IPI method described previously. In other words, a request to a device driver or kernel extension is made which issues an IPI to signal all processors to take an interrupt. When the signal is received, each processor bumps a count and loops until the count equals the total number of processors. When the count equals the total number of processors, each processor records the skewed time stamp, thus causing the time stamps to be recorded simultaneously. The records are later provided to the time library as calibration data.

Thereafter, the management system optionally determines the drift of each processor clock (step 816). The drift for each processor clock may be determined by performing step 802 through step 812 at least twice and observing the relative change in the times reported by each processor clock. The drift may also be determined by other methods. For example, the drift may be determined by observing, respective to each processor clock, the relative change in the times reported by each corresponding clock. A preferred embodiment of observing processor time stamps and identities is the IPI approach described previously with regard to FIG. 4A and step 812 of FIG. 8.

In any case, once the drift of each processor clock is known, information regarding the drift is provided to the time library (step 818), with the process terminating thereafter.

After the time library is initially loaded, the time library should be updated periodically to account for changes in the time reported by processor clocks and for changes in drift in the processor clocks. The time library may be updated by repeating step 802 through 818 at time intervals as determined by a user or by the management system.

Figure 9:
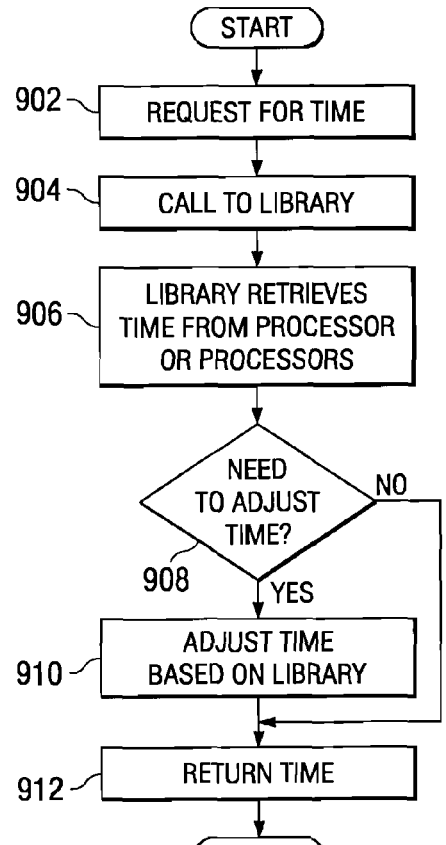
FIG. 9 is a flowchart illustrating a method of processing a request for measuring the time required to execute a program or software routine, in accordance with a preferred embodiment of the present invention.

FIG. 9 is a flowchart illustrating a method of processing a request for measuring the time required to execute a program or software routine, in accordance with a preferred embodiment of the present invention. Once the time library has been created, such as by the method shown in FIG. 8, the time library may be used to normalize the measured time. The reported time will be the normalized measured time. As described above, the reported time is an accurate representation of the time required to execute a program or a software routine.

The process begins with a request for time (step 902). The request for time is a request for current time which may be used to measure the amount of time required to execute a program or a software routine. Thereafter, the management system makes a call to the library (step 904). The library then retrieves the measured time from the clocks on the processor or processors used to execute the program or software routine (step 906).

The management system or the library then determines whether the measured time should be adjusted (step 908). This determination is made based on the time stamp and drift information contained in the library. If the measured time need not be adjusted, then the measured time is returned as the reported time (step 912). The process then terminates. If the measured time should be adjusted, then the management system or the library adjusts the measured time based on the time stamp and drift information contained in the library (step 910). The adjusted time is then returned as the reported time (step 912), with the process terminating thereafter.

The methods described above provide several advantages over known methods of measuring time on high frequency processor clocks. By deliberately adjusting the skew among processor clocks in a symmetric multiprocessor environment, the time on each processor clock may be measured accurately and the identity of which processor helped execute a program at what time may be known. The time and identity information may be used to perform fast and efficient application based tracing. The time and identity information may also be used to create an application level time library that may be used to normalize a measured time of program execution. Thus, the library allows an extremely accurate measurement of the time required to execute a program regardless of which processors executed the program.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method of establishing a library in a data processing environment having a plurality of processors, wherein each processor in the plurality of processors has a clock, the computer-implemented method comprising:

for each clock in the plurality of processors in the data processing environment, setting a skew between each clock to a value sufficiently large that a particular processor may be identified by measuring a first time on the corresponding processor clock and comparing the first time to at least a second time measured by at least one other clock in the data processing environment;

for each processor, recording a time stamp, in a separate buffer of the data processing environment, wherein the time stamp comprises a processor identifier portion containing a unique value of the each processor and a time representation portion containing a time value; and providing the time stamp of each processor to the library for storage, whereby the library contains information regarding the time stamp of one processor relative to the time stamp of other processors in the plurality of processors in the data processing environment.

2. The computer-implemented method of claim 1 further comprising:

evaluating a clock drift for each clock;

responsive to evaluating the clock drift for each clock, establishing a clock drift value for each clock; and providing the clock drift value to the library for storage.

3. The computer-implemented method of claim 2 further comprising:

executing a program in the data processing environment;

requesting a measurement of a time used to execute the program;

calling the library;

retrieving at least one measured time that each processor in the plurality of processors in the data processing environment uses to execute the program, wherein the retrieving is performed in conjunction with the library, and wherein a total measured time to execute the program is a combination of each at least one measured time;

adjusting the total measured time using information contained in the library, to produce an adjusted time; and returning the adjusted time to a requester.

4. The computer-implemented method of claim 1 further comprising:

executing a program in the data processing environment;

requesting a measurement of a time used to execute the program;

calling the library;

retrieving at least one measured time that each processor used to execute the program, wherein the retrieving is performed in conjunction with the library, and wherein a total measured time to execute the program is a combination of each at least one measured time;

adjusting the total measured time using information contained in the library, to produce an adjusted time; and returning the adjusted time to a requester.

5. A computer-program product for establishing a library in a data processing environment having a plurality of processors, wherein each processor in the plurality of processors has a clock, the computer program product comprising:

a computer readable recordable-type media containing computer executable instructions stored thereon, the computer executable instructions comprising:

computer executable instructions responsive for each clock in the plurality of processors in the data processing environment, for setting a skew between each clock to a value sufficiently large that a particular processor may be identified by measuring a first time on the corresponding processor clock and comparing the first time to at least a second time measured by at least one other clock in the data processing environment;

computer executable instructions for recording a time stamp, for each processor, in a separate buffer of the data processing environment, wherein the time stamp comprises a processor identifier portion containing a unique value of the each processor and a time representation portion containing a time value; and computer executable instructions for providing the time stamp of each processor to the library for storage, whereby the library contains information regarding the time stamp of one processor relative to the time stamp of other processors in the plurality of processors in the data processing environment.

6. The computer-program product of claim 5 wherein the computer executable instructions further comprise:

computer executable instructions for evaluating a clock drift for each clock;

computer executable instructions responsive to evaluating the clock drift for each clock, for establishing a clock drift value for each clock; and computer executable instructions for providing the clock drift value to the library for storage.

7. The computer-program product of claim 5 wherein the computer executable instructions further comprise:

computer executable instructions for executing a program in the data processing environment;

computer executable instructions for requesting a measurement of a time used to execute the program;

computer executable instructions for calling the library;

computer executable instructions for retrieving at least one measured time that each processor used to execute the program, wherein the retrieving is performed in conjunction with the library, and wherein a total measured time to execute the program is a combination of each at least one measured time;

computer executable instructions for adjusting the total measured time using information contained in the library, to produce an adjusted time; and returning the adjusted time to a requester.

8. The computer-program product of claim 6, wherein the computer executable instructions further comprise:

computer executable instructions for executing a program in the data processing environment;

computer executable instructions for requesting a measurement of a time used to execute the program;

computer executable instructions for calling the library;

computer executable instructions for retrieving at least one measured time that each processor in the plurality of processors in the data processing environment uses to execute the program, wherein the retrieving is performed in conjunction with the library, and wherein a total measured time to execute the program is a combination of each at least one measured time;

computer executable instructions for adjusting the total measured time using information contained in the library to produce an adjusted time; and computer executable instructions for returning the adjusted time to a requester.

* * * * *